(12) United States Patent
Willmann et al.

(10) Patent No.: US 9,508,268 B2
(45) Date of Patent: Nov. 29, 2016

(54) SYSTEM AND METHOD OF TRAINING A DYSARTHRIC SPEAKER

(75) Inventors: Richard Willmann, Siegburg (DE); Gerd Lanfermann, Aachen (DE); Dieter Geller, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2311 days.

(21) Appl. No.: 12/301,309

(22) PCT Filed: May 11, 2007

(86) PCT No.: PCT/IB2007/051787
§ 371 (c)(1),
(2), (4) Date: Nov. 18, 2008

(87) PCT Pub. No.: WO2007/135605
PCT Pub. Date: Nov. 29, 2007

(65) Prior Publication Data
US 2009/0119109 A1    May 7, 2009

(30) Foreign Application Priority Data
May 22, 2006 (EP) ..................... 06114304

(51) Int. Cl.
*G10L 15/26* (2006.01)
*G09B 19/04* (2006.01)

(52) U.S. Cl.
CPC .............. *G09B 19/04* (2013.01); *G10L 15/26* (2013.01)

(58) Field of Classification Search
CPC ..................................................... G10L 25/66
See application file for complete search history.

(56) References Cited

U.S. PATENT DOCUMENTS

| 4,641,343 | A | | 2/1987 | Holland et al. |
| 5,647,834 | A | * | 7/1997 | Ron ................................. 600/23 |
| 5,794,203 | A | * | 8/1998 | Kehoe ........................... 704/271 |
| 6,662,162 | B2 | * | 12/2003 | Casper .......................... 704/271 |
| 6,711,544 | B2 | * | 3/2004 | Spiser-Albert et al. ...... 704/271 |
| 6,732,076 | B2 | * | 5/2004 | Masterson et al. ........... 704/254 |
| 7,283,962 | B2 | * | 10/2007 | Meyerhoff et al. ........... 704/270 |
| 2002/0087322 | A1 | * | 7/2002 | Fletcher ....................... 704/270 |
| 2004/0230430 | A1 | | 11/2004 | Gupta |
| 2005/0095564 | A1 | * | 5/2005 | Stuart et al. .................. 434/112 |
| 2006/0177799 | A9 | * | 8/2006 | Stuart et al. .................. 434/112 |

(Continued)

FOREIGN PATENT DOCUMENTS

| EP | 1089246 A2 | 4/2001 | |
| GB | 2399932 A * | 9/2004 | ............. G10L 15/08 |
| JP | 6175373 | 4/1986 | |

(Continued)

OTHER PUBLICATIONS

Oster, A-M. "Clinical applications of computer-based speech training for children with hearing impairment." Spoken Language, 1996. ICSLP 96. Proceedings., Fourth International Conference on. vol. 1. IEEE, 1996.*

(Continued)

*Primary Examiner* — Brian Albertalli
(74) *Attorney, Agent, or Firm* — Larry Liberchuk

(57) ABSTRACT

The invention describes a computer-based system that asks (101) a patient to pronounce a word displayed on a monitor, automatically assesses (104, 105) the speech quality, and uses suitable means to feed back (106) any improvement or deterioration of speech quality.

8 Claims, 2 Drawing Sheets

(56) References Cited

U.S. PATENT DOCUMENTS

| | | |
|---|---|---|
| 2007/0055523 A1 | 3/2007 | Yang |
| 2007/0213981 A1* | 9/2007 | Meyerhoff et al. ........... 704/243 |

FOREIGN PATENT DOCUMENTS

| | | |
|---|---|---|
| JP | H1063287 | 3/1998 |
| JP | 2001282096 A | 10/2001 |
| JP | 2002156897 | 5/2002 |
| JP | 2004252019 | 9/2004 |
| JP | 5313562 B2 | 10/2013 |

OTHER PUBLICATIONS

Anderson, Sven, and Diane Kewley-Port. "Evaluation of speech recognizers for speech training applications." Speech and Audio Processing, IEEE Transactions on 3.4 (1995): 229-241.*

Kewley-Port, Diane, et al. "Speaker-dependent speech recognition as the basis for a speech training aid." Acoustics, Speech, and Signal Processing, IEEE International Conference on ICASSP'87.. vol. 12. IEEE, 1987.*

Palmer, Rebecca, Pam Enderby, and S. P. Cunningham. "The effect of three practice conditions on the consistency of chronic dysarthric speech." Journal of Medical Speech Language Pathology 12.4 (2004): 183-188.*

Carmichael, James, and Phil Green. "Revisiting dysarthria assessment intelligibility metrics." Proceedings of the 8th International Conference on Spoken Language Processing (ICSLP'04). 2004.*

Hatzis, Athanassios, et al. "An integrated toolkit deploying speech technology for computer based speech training with application to dysarthric speakers." Interspeech. 2003.*

Hawley, Mark, et al. "STARDUST; speech training and recognition for dysarthric users of assistive technology." 7th European Conference for the Advancement of Assistive Technology (AAATE 2003). 2003.*

Parker, Mark, et al. "Automatic speech recognition and training for severely dysarthric users of assistive technology: The STARDUST project." Clinical linguistics & phonetics 20.2-3 (2006): 149-156.*

Sy, Bon K. and David M. Horowitz. "A statistical causal model for the assessment of dysarthric speech and the utility of computer-based speech recognition." Biomedical Engineering, IEEE Transactions on 40.12 (1993): 1282-1298.*

Green, Phil D., et al. "Automatic speech recognition with sparse training data for dysarthric speakers." Interspeech. 2003.*

Öster, Anne-Marie, et al. "Presentation of a new EU project for speech therapy: OLP (Ortho-Logo-Paedia)." Proceedings of the XV Swedish Phonetics Conference (Fonetik 2002). 2002.*

Mouri, T. et al, "On the Corrective Feedback for Japanese CALL System Considering Vowel Durations", Technical Report of IEICE, vol. 102, No. 750, 2003, Japan, The Institute of Electronics Information and Communication Engineers.

Oster, Anne-Maria et al, "Clinical Applications of Computer-Based Speech Training for Children with Hearing Impairment", Spoken Language, 1996. ICSLP 96. Proceedings., Fourth International Conference on, Oct. 6, 1996.

Gu, L. et al., "Disordered Speech Evaluation using Objective Quality Measures", IEEE ICASSP 2005 I-321.

Witt S. M. et al., "Use of Speech Recognition in Computer-Assisted Language Learning ", PhD Thesis, Universty of Cambridge Dept of Engineering, 1999.

Thomas-Stonell, T. et al., "Evaluation of a Computer-Based Program for Training Speech Rate with Children and Adolescents with Dysarthria", Journal of Medical Speech-Language Pathology, 9 (1) (2001).

H. Boulard et al: Optimizing Recognition and Rejection Performance in Word Spotting Systems, PROC. ICASSP, vol. 1, Apr. 1994, p. 373.

* cited by examiner

SYSTEM AND METHOD OF TRAINING A DYSARTHRIC SPEAKER

The present invention relates to a system and method of training a dysarthric speaker. Furthermore, the invention relates to a computer program for training a dysarthric speaker.

Speech deficits are a common symptom of neurological diseases such as stroke. In the US, 700,000 new cases of stroke occur per year. While deadly in 20% of the cases, stroke causes impairments in over 60% of the victims. About 25% of the patients show speech deficits. Rehabilitation measures and loss of work force inflict costs of $50 B to the US society per year.

There are two large groups of speech deficits: aphasia and dysarthria. Aphasia is an inability of the patient to name objects correctly. Dysarthria is the inability of the patient to pronounce words clearly and correctly.

Speech therapists exercise with dysarthric speakers in one-to-one sessions, usually by having the patient repeat a word. The patient receives no detailed corrections. Obviously, this form of therapy is cost intensive and very demanding on the therapist.

To maximize rehabilitation efforts while optimizing costs, it is desirable that rehabilitation exercises are continued by the patient at home without a supervising professional being available. It is well known that appropriate feedback enhances rehabilitation success. To this end, automatic assessment of exercises is necessary, e.g. by means of a computer.

Aphasia is relatively easy to test for on a computer, e.g. by displaying an image of an object and asking the patient in a multiple choice fashion what the correct name of the object is. Training software is commercially available and used in rehabilitation practice. However, dysarthria is harder to test for on a computer, due to the potentially severe speech condition. Presently, systems for unsupervised training of impaired speech are only available for aphasia, not for dysarthria.

It is an object of the present invention to provide an inexpensive, reliable and unsupervised technique of training a dysarthric speaker.

This object is achieved according to the invention by a system for training a dysarthric speaker, the system comprising a first computing module adapted to automatically determine a speech quality measure for an input utterance of the speaker, a second computing module adapted to automatically compare the speech quality measure with at least one previous speech quality measure of the speaker, and a feedback module adapted to automatically provide a biofeedback to the speaker based upon this comparison.

The object of the present invention is also achieved by a method of training a dysarthric speaker, comprising the steps of automatically determining a speech quality measure for an input utterance of the speaker, automatically comparing the speech quality measure with at least one previous speech quality measure of the speaker, and based upon this comparison, automatically providing biofeedback to the speaker.

The object of the present invention is also achieved by a computer program to be executed in a computer, said program comprising computer instructions to automatically determine a speech quality measure for an input utterance of the speaker, computer instructions to automatically compare the speech quality measure with at least one previous speech quality measure of the speaker, and computer instructions to automatically provide biofeedback to the speaker, based upon this comparison, when the computer program is executed in the computer. The technical effects necessary according to the invention can thus be realized on the basis of the instructions of the computer program in accordance with the invention.

Such a computer program can be stored on a carrier such as a CD-ROM or it can be available over the Internet or another computer network. Prior to executing the computer program, it is loaded into the computer by reading the computer program from the carrier, for example by means of a CD-ROM player, or from the Internet, and storing it in the memory of the computer. The computer includes inter alia a central processor unit (CPU), a bus system, memory means, e.g. RAM or ROM etc., storage means, e.g. floppy disk or hard disk units etc. and input/output units. Alternatively, the inventive method could be implemented in hardware, e.g. using one or more integrated circuits.

A core idea of the invention is to provide a technique for automatically training a dysarthric speaker by means of a simple inexpensive training system. This idea can be realized for example by means of a standard computer system, a microphone coupled to the computer system and a dedicated computer program to be executed on the computer system.

Another core idea of the invention is that the speaker, e.g. the rehabilitating patient, improves his condition through the effect of biofeedback. Biofeedback is a technique in which a person is trained to improve his body condition by using signals from his own body. In the present case, information about the speech ability of the speaker is given back to the speaker. Preferably, the feedback information depends on improvement or deterioration of speech quality. Using this feedback information, the speaker can take steps to improve his speech ability. The biofeedback mechanism allows the speaker to receive, e.g. to see or hear, information about his speech ability. For this purpose, an utterance of the speaker is "translated" into a signal, which can be detected by the speaker, e.g. a flashing light bulb, a beeper or the like. For example, the improvement in speech quality compared to previous results is illustrated in form of a "traffic light" or specific sound. The speaker attempts to improve his skill and monitors his own performance. According to the results provided through biofeedback signals, the speaker "automatically" adjusts his speech. By using such a biofeedback mechanism, there is no need for detailed linguistic corrections. This reduces the cost and effort of training considerably. Because the training is provided completely automatically, no treatment or training errors can occur. Thus, the training technique according to the present invention is very reliable.

According to the invention, the speaker is not trained to produce speech which is only understood by a machine. This aim could easily be reached by requesting the speaker to repeat a certain word always in the same way. Instead, the system and method according to the present invention aim at improving the intelligibility of the users speech for every average human listener. For this reason, in a preferred embodiment of the invention, the measure of speech quality correlates to the deviation of the produced speech from an averaged normal speech production.

The present invention presents a realization of a technique for training speech quality of dysarthric speakers. It enables the user to train pronunciation without the presence of a speech therapist. Feedback is given to the patient that guides him towards a better speech quality.

With the present invention, an unsupervised training can be provided. Thus, the invention can shorten or even eliminate a cost-intensive therapy including expensive sessions with speech therapists. To summarize, the present invention provides a simple, inexpensive and reliable technique for training a dysarthric speaker without the need of supervision.

These and other aspects of the invention will be further elaborated on the basis of the following embodiments which are defined in the dependent claims.

According to a preferred embodiment of the invention, the system comprises a recording devise adapted to record the input utterance of the speaker. According to the inventive method, the input utterance of the speaker is recorded prior to determining the speech quality measure. The recording device, for example a microphone, is preferably connected to the first computing module in order to directly feed in the speaker's voice. Alternatively, the speaker's utterance is transmitted from the microphone to a pre-processing device, e.g. a voice filter or the like, which is adapted to pre-process the speaker's voice prior to the computing step carried out by means of the first computing module. Preferably, the speaker's utterance is processed and evaluated immediately after the utterance is made, i.e. the utterance is not stored in a database or the like. Thus, the training system can be designed in a very simple and inexpensive way.

According to another preferred embodiment of the invention, the system comprises an interface module adapted to provide a speaking instruction to the speaker. According to the inventive method, a speaking instruction is provided to the speaker prior to recording the input utterance of the speaker. For this purpose, the interface module of the training system preferably comprises a monitor means, e.g. a built-in display, for displaying the words to be repeated by the speaker. In other words, the speaker reads the words to be repeated. Instead of built-in monitor means, the interface module may be connected to an external display. Alternatively or additionally to the monitoring means, the interface module comprises a speech output device, e.g. a built-in loudspeaker, for playing back the words to be repeated by the speaker. In other words, the speaker listens to the word or words to be repeated. If such a speaking instruction is implemented, the speech analysis carried out by the first computing module can be much easier, faster and less complex, than in the case that the speaker speaks a random word. Thus, the first computing module can be built in a less complex manner, which leads to a significant cost reduction.

After the speaker's utterance is input into the training system, the system automatically assesses the speech quality. For this purpose, speech recognition technology is used.

According to another preferred embodiment of the invention, the first computing module comprises a speech analysis component adapted to carry out a speech recognition and speech analysis on a phoneme and/or word level. According to the inventive method, the step of determining the speech quality measure comprises carrying out a speech analysis on a phoneme and/or word level. A speech analysis on a phoneme and/or word level is preferred because dysarthric speakers have in most cases deficits in the production of specific sounds. These sounds form the phonemes, the smallest units of speech that form the differences in the sounds of syllables, words and whole sentences. Speech analysis on a word level allows the comparison of phoneme quality in similar words: e.g. 'cheese' and 'freeze' both contain the 'e:' phoneme. It is also possible to analyze phonemes in the context of neighboring ones: e.g. if a patient shows problems in pronouncing 'killed' while being able to speak 'cold', 'mold' and 'kitten', it becomes apparent that the sequence of 'i' and 'l' causes problems. Thus, speech analysis on a phoneme basis allows analyzing which specific sounds deviate from the same sounds uttered by a plurality of non-dysarthric speakers.

According to another preferred embodiment of the invention, the first computing module comprises a comparing component adapted to compare the input utterance with reference data, which is based upon data of a plurality of non-dysarthric speakers. According to the inventive method, the step of determining the speech quality measure comprises comparing the input utterance with such reference data. Preferably, the reference data is based upon averaged data of a plurality of non-dysarthric speakers. For this purpose, data on a reference pronunciation is provided, e.g. in a database, for each word to be used in training. The reference pronunciation data has been collected prior to the training and represents the averaged pronunciation of words by a plurality of non-dysarthric speakers.

Based on the speech analysis and the comparison with reference data the first computing module computes an objective speech quality measure. The speech quality measure is preferably determined for each single training word. All results, i.e. speech quality measures for training words, are stored by the first computing module in a training database. Preferably the training results are stored together with a time stamp. By this means each result can later by assigned to a specific date and time of day.

According to another preferred embodiment of the invention, the second computing module comprises an evaluation component adapted to carry out a comparative evaluation of the speech quality measure with respect to previous results of the speaker. According to the inventive method, the step of comparing the speech quality measure comprises carrying out a comparative evaluation of the speech quality measure with respect to previous results of the speaker. For this purpose, historic training data, i.e. a former speech quality measure for the respective word, is used for carrying out the comparison. Such historic training data is stored in the training database, which can be accessed by the second computing module. Preferably, the second computing module evaluates the speech quality depending not only on previous results, but also on the time of day the training is performed. Thus, time-dependent performance fluctuations can be minimized or eliminated.

As a result of this evaluation of the speech quality measure with respect to previous results, information about improvement or impairment of pronunciation is provided, preferably for each single word. In other words, personal improvements are being used for biofeedback.

These and other aspects of the invention will be described in detail hereinafter, by way of example, with reference to the following embodiments and the accompanying drawings, in which.

Figure 1:
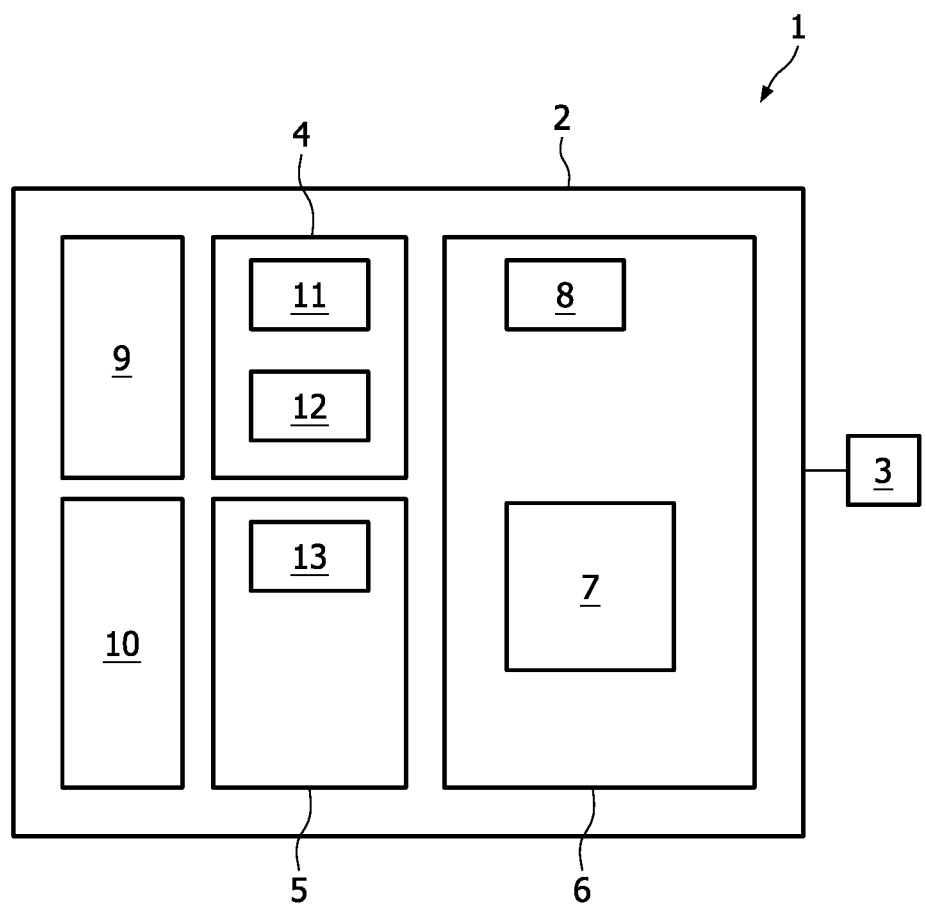
FIG. 1 shows a schematic block diagram of a system according to the invention.
Figure 2:
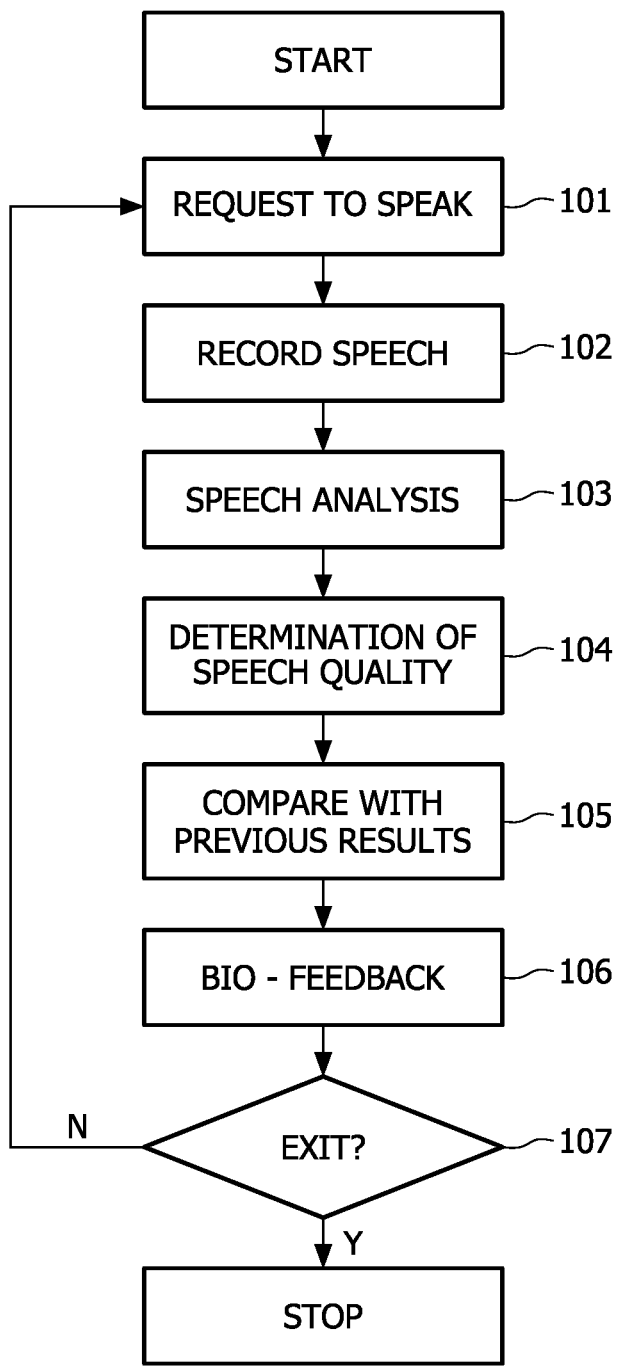
FIG. 2 shows a simplified flowchart of the method according to the invention.

In the described embodiment, the system 1 for training a dysarthric speaker is realized by means of a standard computer system 2, e.g. a notebook or PC, a microphone 3 coupled to the computer system 2 and a dedicated computer program to be executed on the computer system 2. The computer program executed on the computer system 2 realizes a first computing module 4 and a second computing module 5. Furthermore, the computer system 2 comprises a combined interface and feedback module 6. All appliances of the system 1 are adapted to carry out the method according to the present invention. All modules, devices and components are constructed and programmed in such a way that the procedures for data and/or information input, processing, and output run in accordance with the method of the invention. In particular the processing unit of the computer system 2 is adapted to perform all the tasks of calculating and computing the input data as well as determining and assessing results. This is achieved, according to the invention, by means of the dedicated computer software comprising computer instructions adapted for carrying out the steps of the inventive method, when the software is executed in the processing unit of the computer system 1. The processing unit itself may comprise functional modules or units, which are implemented in form of hardware, software or in form of a combination of both.

In a first step 101, a user (speaker) is requested to speak a word or short sentence. For this purpose, the combined interface and feedback module 6 provides a speaking instruction to the speaker. The combined interface and feedback module 6 comprises the built-in monitor 7 of the computer system 2 or an external monitoring means, e.g. a television set, which is connected to the computer system. The combined interface and feedback module 6 further comprises a built-in loudspeaker 8 for playing back the words to be repeated by the speaker. For providing the speaking instruction the combined interface and feedback module 6 is controlled by the dedicated computer program.

In a next step 102, the user's speech, i.e. an input utterance of the speaker, is recorded by means of the microphone 3, which is connected to the computer system 2 and adapted to transfer the speech signals to the computer system 2 for processing.

Subsequently, a speech quality measure for the input utterance of the speaker is computed by means of the first computing module 4. For this purpose, a speech recognition is carried out in step 103 by a speech analysis component 11 of the first computing module 4. The speech recognition is carried out on a phoneme and/or word level in order to determine the spoken word or words. Subsequently, a comparing component 12 of the first computing module 4 compares in step 104 the input utterance with reference data, which is based upon averaged data of a plurality of non-dysarthric speakers. For this purpose, the comparing component 12 accesses a reference database 9, in which reference data for each training word is stored. Based on the speech analysis and the comparison with reference data, the first computing module 4 computes an objective speech quality measure for each single training word.

Preferably, the first computing module 4 operates as follows: A word W is given for pronunciation training. The speaker's speech production may be a word O. The first computing module 4 now computes two probabilities. First, the probability that the given speech production O matches the given word W, so-called "forced alignment". Second, the maximum of the probabilities that the given speech production O is an arbitrary series of phonemes, so called "free phoneme loop". The ratio R of the two probabilities (R=W/O) yields a measure for the pronunciation quality of the given word W. Details illustrating this approach can be found in the paper by H. Boulard and B. D'hoors 'Optimizing recognition and rejection performance in word spotting systems', Proc. ICASSP, Vol 1, Page 373, April 1994.

Subsequently, the speech quality measures R are stored by the first computing module 4 in a training database 10 together with a time stamp and the corresponding word or words.

In a next step 105, an evaluation component 13 of the second computing module 5 automatically compares the speech quality measure with at least one previous speech quality measure of the speaker. During this step, previous results may be taken into account by averaging all values of the current session and/or by using min/max values of the session and/or by weighting each value with regard to time (most recent values are more heavily weighted) followed by averaging and/or by taking into account accumulated results of previous sessions. For this purpose, the evaluation component accesses the training database 10, in which previous results for each training word are stored. If the system is used for the first time, the measured speech quality on a standard set of words is used for initializing the database 10 of historic training data and initializing the performance level relative to which biofeedback is given.

In a next step 106, a feedback is given to the speaker, which is based on the current exercise results. For this purpose, the combined interface and feedback module 6 provides a "traffic light" signaling scheme, in which in case of an improvement a green light is shown, in case of no improvement a yellow light is shown and in case of a deterioration a red light is shown to the speaker through the built-in monitor 7 of the computer system 2. For providing the feedback information, the combined interface and feedback module 6 is controlled by the computer program.

Preferably, the speaker is requested to repeat the training process until an exit condition is met (step 107). Such an exit condition may be for example: maximum training time reached, maximum "green" results in a row reached, maximum "yellow" results in a row reached, maximum "red" results in a row reached, maximum number of exercise runs exceeded, manual stop.

The general training results as well as the training results related to every single word or phrase are stored in a result database (not shown) and/or made available to the therapist by means of the computer system 2, e.g. by online data transfer to the therapist through a computer network, like the internet.

The present invention can preferably be used as part of the home stroke test, as part of a home-based rehabilitation application or in a rehabilitation clinic. The invention can further be used as part of a telemedicine platform.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. It will furthermore be evident that the word "comprising" does not exclude other elements or steps, that the words "a" or "an" do not exclude a plurality, and that a single element, such as a computer system or another unit, may fulfil the functions of several means recited in the claims. Any reference signs in the claims shall not be construed as limiting the claim concerned.

REFERENCE NUMERALS 1 system
2 computer
3 microphone
4 first computing module
5 second computing module 6 combined interface and feedback module
7 monitor
8 loudspeaker
9 reference database training database
11 speech analysis component
12 comparing component
13 evaluation component

The invention claimed is:

1. A system for training a dysarthric speaker, comprising
a first computing module to automatically determine a speech quality measure for an input utterance of the speaker for at least one training element,
a second computing module to automatically compare the speech quality measure with at least one previous speech quality measure of the speaker related to the at least one training element, and
a feedback module to automatically provide a biofeedback to the speaker based upon this comparison.

2. The system as claimed in claim 1, comprising a recording device adapted to record the input utterance of the speaker.

3. The system as claimed in claim 1, comprising an interface module adapted to provide a speaking instruction to the speaker.

4. The system as claimed in claim 1, wherein the first computing module comprises a speech analysis component to carry out a speech analysis on a phoneme and/or word level of the at least one training element.

5. The system as claimed in claim 1, wherein the first computing module comprises a comparing component to compare the input utterance with reference data, said reference data being based upon data of a plurality of non-dysarthric speakers with respect to the at least one training element.

6. The system as claimed in claim 1, wherein the second computing module comprises an evaluation component to carry out a comparative evaluation of the speech quality measure with respect to previous results of the speaker related to the at least one training element.

7. A method of training a dysarthric speaker, comprising the steps of
automatically determining a speech quality measure for an input utterance of the speaker for at least one training element,
automatically comparing the speech quality measure with at least one previous speech quality measure of the speaker related to the at least one training element, and
based upon this comparison, automatically providing a biofeedback to the speaker.

8. A computer program to be executed in a computer, said program being embodied in a non-transitory computer readable medium, comprising:
computer instructions to automatically determine a speech quality measure for an input utterance of the speaker for at least one training element,
computer instructions to automatically compare the speech quality measure with at least one previous speech quality measure of the speaker related to the at least one training element, and
computer instructions to automatically provide a biofeedback to the speaker, based upon this comparison.

* * * * *